United States Patent [19]
Cooper

[11] Patent Number: 5,263,238
[45] Date of Patent: Nov. 23, 1993

[54] METHOD OF FORMING A STEM AND ASSEMBLING A SNAP RING IN A GROOVE IN THE STEM

[75] Inventor: Kenneth E. Cooper, Niles, Mich.

[73] Assignee: Shepherd Products U.S., Inc., St. Joseph, Mich.

[21] Appl. No.: 839,270

[22] Filed: Feb. 20, 1992

[51] Int. Cl.$^5$ .............................................. B23P 11/00
[52] U.S. Cl. ........................................ 29/444; 29/509; 29/512; 72/67; 72/356
[58] Field of Search ............... 29/509, 512, 444, 524.1, 29/525.2; 72/356, 67

[56] References Cited

U.S. PATENT DOCUMENTS

| | | |
|---|---|---|
| 1,896,028 | 1/1933 | Burvenick . |
| 2,464,622 | 3/1949 | Veit . |
| 2,577,654 | 12/1951 | Gates . |
| 2,847,696 | 8/1958 | Kramcsak, Jr. . |
| 2,957,237 | 10/1960 | Réglé et al. . |
| 3,497,946 | 3/1970 | Tingley, Jr. . |
| 3,686,743 | 8/1972 | Thillet . |
| 3,702,085 | 11/1972 | Hicok . |
| 3,755,852 | 9/1973 | Greene . |
| 3,812,756 | 5/1974 | Wenger . |
| 3,834,006 | 9/1974 | Greene . |
| 4,120,071 | 10/1978 | Crescenzi . |
| 4,129,921 | 12/1978 | Greene . |
| 4,189,978 | 2/1980 | Mauer . |
| 4,214,781 | 7/1980 | Joseph . |
| 4,364,159 | 12/1982 | Holcombe . |
| 4,607,539 | 8/1986 | Arima et al. . |
| 4,615,098 | 10/1986 | Côme et al. . |
| 4,655,658 | 4/1987 | Gulistan . |
| 4,916,801 | 4/1990 | Cooper . |

FOREIGN PATENT DOCUMENTS

| | | |
|---|---|---|
| 217033 | 6/1924 | United Kingdom . |
| 1485591 | 9/1977 | United Kingdom . |

Primary Examiner—Joseph M. Gorski
Attorney, Agent, or Firm—Lee, Mann, Smith, McWilliams, Sweeney & Ohlson

[57] ABSTRACT

A method of forming a stem and assembling a snap ring in a groove in the stem without expansion of the snap ring. A stem blank is formed having a reduced diameter extension. A snap ring is slid over the extension without expansion of the snap ring and is positioned against a lower support surface. An orbitally rotating punch is inserted at an angle into the top end of the extension thereby deforming the top end and forming a continuous, tear free collar which forms an upper wall of a groove defined between the collar and the support surface. The snap ring lies within the groove and is free to move from the support surface towards the collar.

4 Claims, 3 Drawing Sheets

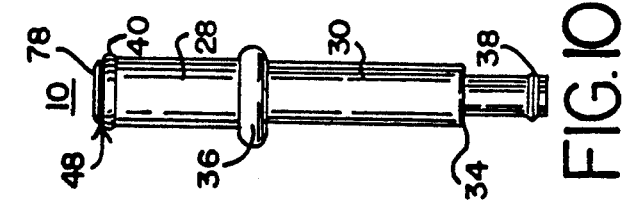
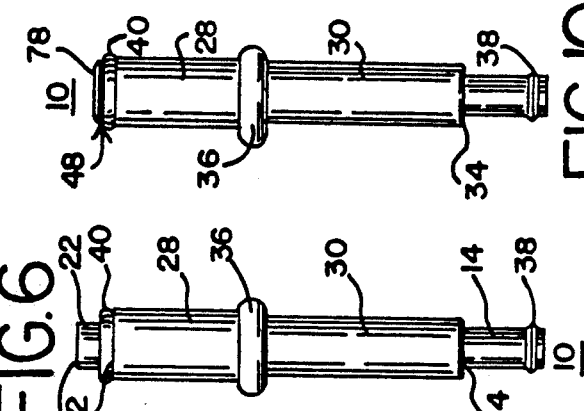
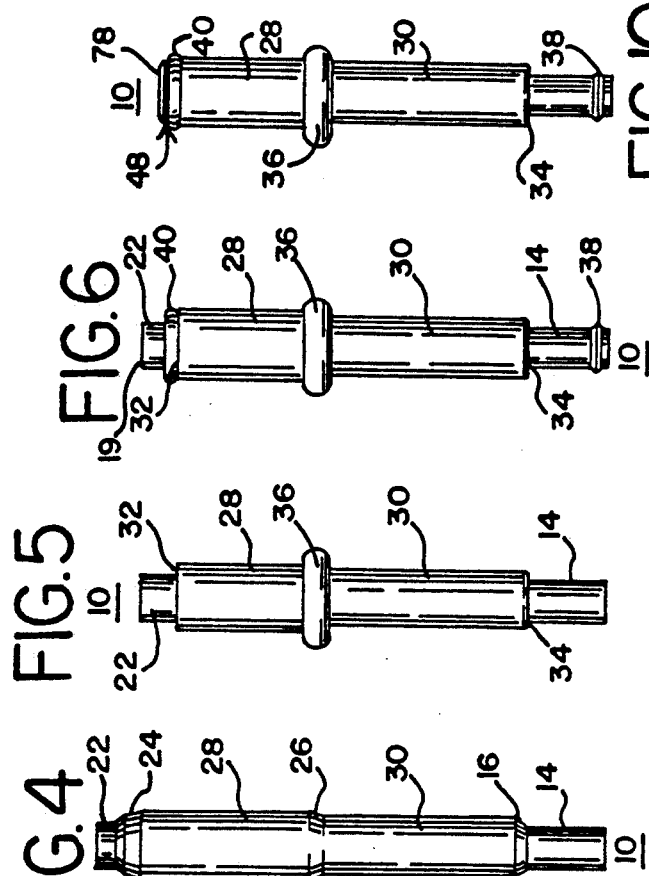
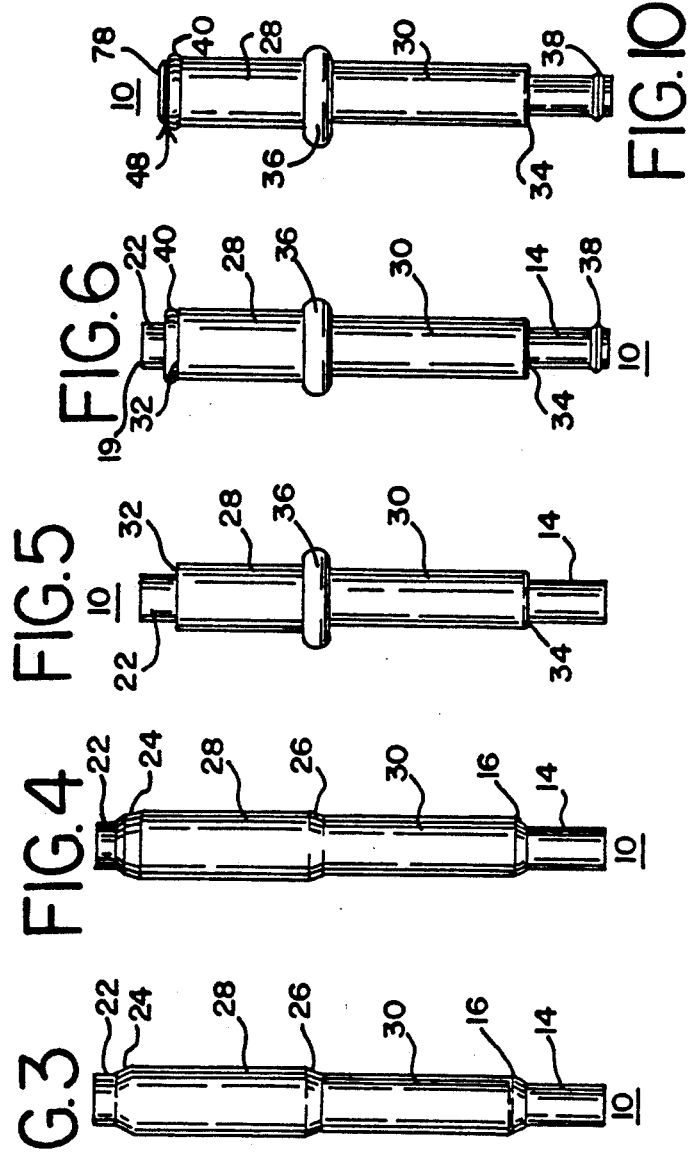
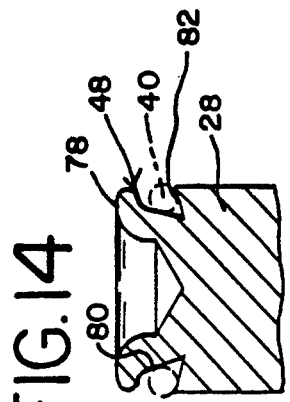
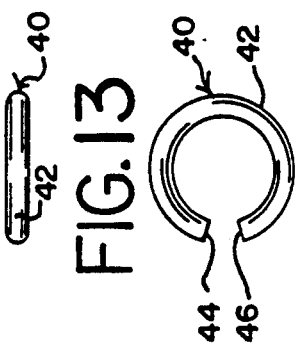
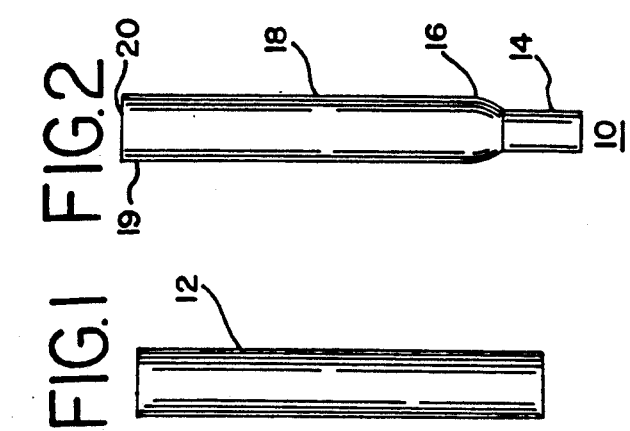
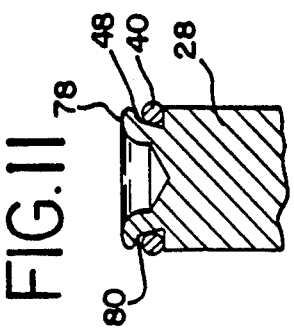

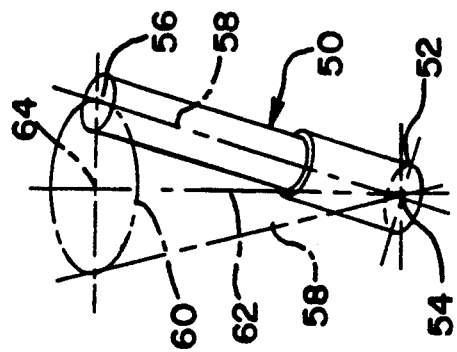
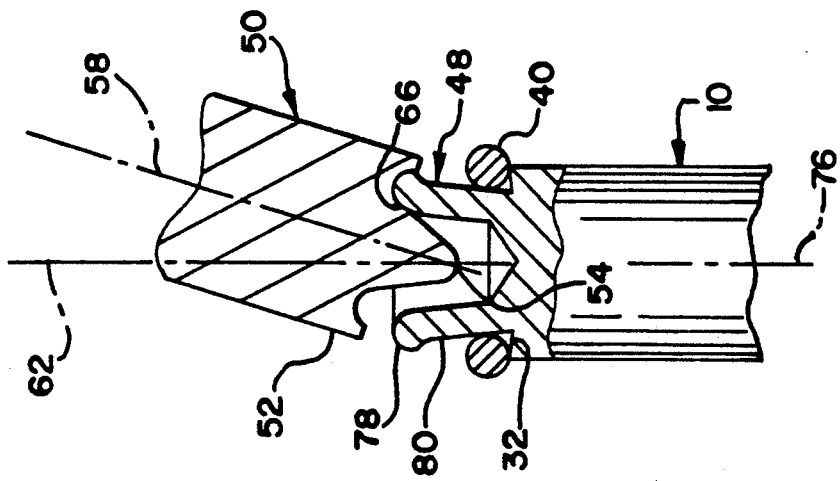
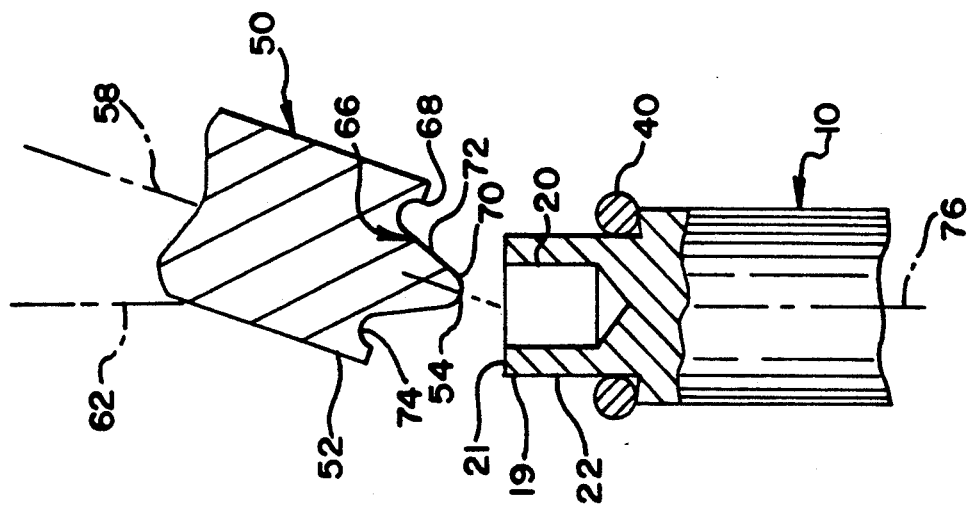

METHOD OF FORMING A STEM AND ASSEMBLING A SNAP RING IN A GROOVE IN THE STEM

BACKGROUND OF THE INVENTION

The present invention relates to a method of forming a stem and assembling a snap ring in a groove in the stem without expanding the snap ring. Methods of this general type are shown in U.S. Pat. Nos. 1,896,028, 2,464,622, 2,957,237, 3,686,743, 3,702,085 and 4,189,978. Prior methods of forming a groove about which a snap ring is inserted comprised milling the groove in the stem and then deforming the ends of the snap ring to force the snap ring to fit about the daimeter of the stem and then closing the snap ring ends. U.S. Pat. No. 4,916,801 assigned to Shepherd Products U.S., Inc., the assignee of the present invention, also discloses a method of forming a stem with a groove and a snap ring. The method in that patent includes the steps of inserting a nonrotating punch into a recess defined in a pierced extension of the stem and then applying downward force with the punch to peen the pierced extension over the snap ring to form a collar which defines the upper wall of the groove. In utilizing this method, it has been found that in some instances when the punch is forced downwardly to peen over the pierced extension to form the collar, the collar may become ripped or torn. This tearing or ripping of the collar is not only aesthetically displeasing but also leads to progressive cracking or breaking of the extension, causes problems in inserting the stem into furniture bases, and poses risks to assembly personnel of becoming cut with the edges of the torn collar. Stem and snap ring assemblies and other caster retention mechanisms are shown in U.S. Pat. Nos. 3,755,852, 3,834,006 and 4,129,921.

SUMMARY OF THE INVENTION

The method of the present invention comprises forming a stem with a reduced diameter portion and assembling a snap ring over the reduced diameter of the stem. The snap ring is placed over the end of the reduced diameter section and lowered against a support surface without expanding the ends or the diameter of the snap ring. An orbitally rotating punch is inserted downwardly into the top end of the reduced diameter section of the stem. The longitudinal axis of the punch is set at an angle to the longitudinal axis of the stem, with the tip of the punch being located on the longitudinal axis of the stem. The opposite end of the punch is located in a head which rotates in a circular orbit. The punch exerts a downward and radially outward force on the top end of the stem such that the top end of the stem is deformed into a smooth continuous collar free of breaks or tears which collar forms the upper wall of a groove and which retains the snap ring on the stem.

BRIEF DESCRIPTION OF THE DRAWINGS

FIG. 1 is a side view of a length of wire from which the stem of the present invention is formed.

FIG. 2 is a side view of the stem at the first stage of the formation process.

FIG. 3 is a side view of the stem at the second stage of the formation process.

FIG. 4 is a side view of the stem at the third stage of the formation process.

FIG. 5 is a side view of the stem at the fourth stage of the formation process.

FIG. 6 is a side view of the stem at the fifth stage of the formation process.

FIG. 7 is an enlarged partial cross-sectional view of a stem having a pierced extension at the fifth stage of the formation process and a partial cross-sectional view of a pointed orbitally rotating punch positioned to engage the stem.

FIG. 8 is an enlarged partial cross sectional view of the stem of FIG. 7 at the sixth stage of the formation process and a partial cross sectional view of the orbitally rotating punch of FIG. 7 fully engaging the top end of the stem.

FIG. 9 is a schematic diagram of the orbitally rotating punch.

FIG. 10 is a side view of the assembled stem and snap ring.

FIG. 11 is an enlarged partial cross sectional view of the top end of the assembled stem and snap ring.

FIG. 12 is a side view of the snap ring.

FIG. 13 is a top view of the snap ring of FIG. 12.

FIG. 14 is an enlarged partial cross sectional view of a modified embodiment of the assembled stem and snap ring.

DESCRIPTION OF THE PREFERRED EMBODIMENTS

Figure 16:
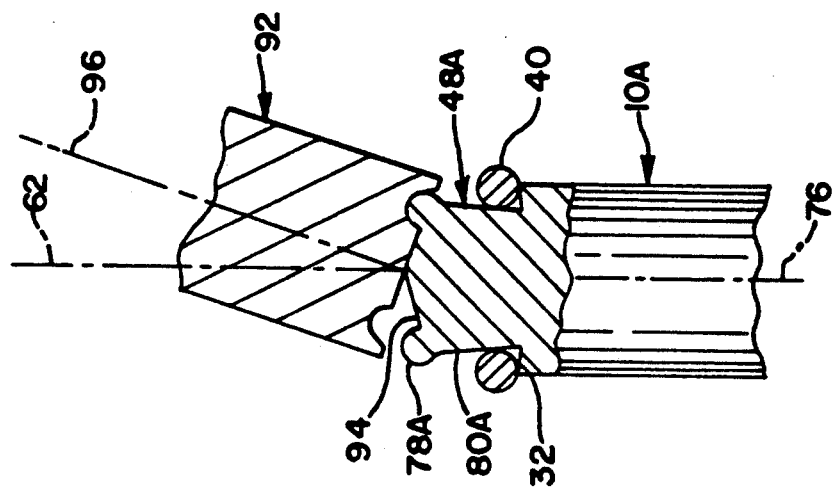
FIG. 16 is an enlarged partial cross-sectional view of the stem of FIG. 15 and a partial cross-sectional view of the punch of FIG. 15 fully engaging the top end of the stem.
Figure 15:
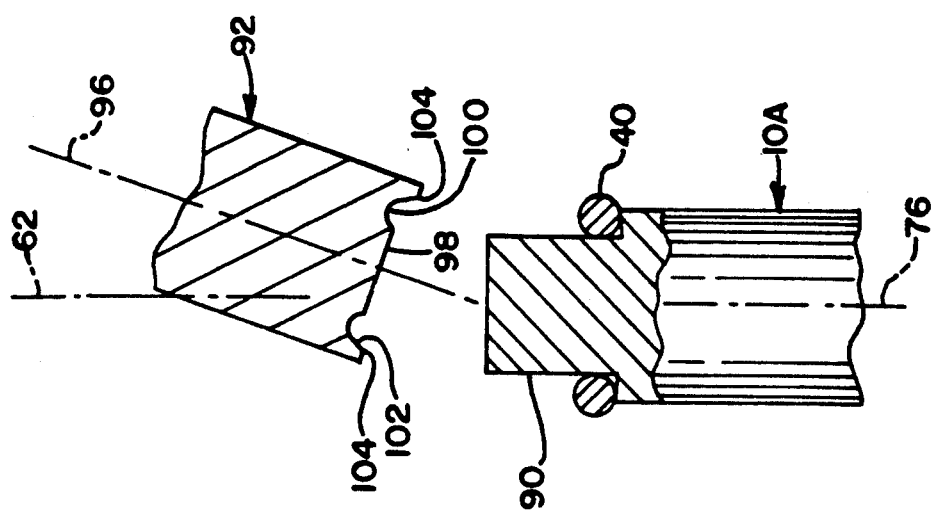
FIG. 15 is an enlarged partial cross-sectional view of a stem having a solid extension and a partial cross-sectional view of a generally flat orbitally rotating punch positioned to engage the stem.

FIGS. 1-11 in the drawings show the various stages involved in one method of forming a stem with a groove and assembling a snap ring and FIGS. 14-16 show alternate methods. The completed stem formed by the method of the present invention is adapted to have its upper end inserted into the leg of a chair or other piece of furniture and to have its lower end inserted into a caster wheel assembly.

The stem, generally indicated by the numeral 10, is formed from a substantially cylindrical solid length of metal wire 12 which has been cut to the required length as shown in FIG. 1. At the first stage, as shown in FIG. 2, the stem 10 is forced into a die (not shown) and the diameter of the stem 10 is reduced at the base thereby defining a stem end 14, a first tapered portion 16 and a stem body 18. The upper or top end 19 of the stem body 18, opposite the stem end 14, is then pierced by a punch (not shown) to form a substantially cylindrical recess 20 in the top end 19. As shown in FIG. 3, the diameter of the pierced end 19 of the stem body 18 is reduced at the second stage of the formation process thereby forming a pierced extension 22 having a circular edge 21 and forming a second tapered portion 24. The diameter of the lower portion of the stem body 18 is also reduced thereby defining a third tapered portion 26 such that the stem body 18 now comprises an upper body 28, defined between the second tapered portion 24 and third tapered portion 26, and a lower body 30 defined between the third tapered portion 26 and the first tapered portion 16.

At the third stage of the process, as shown in FIG. 4, the diameter of the pierced extension 22 is reduced further.

At the fourth stage of the formation process, as shown in FIG. 5, the second tapered portion 24 defined at the base of the pierced extension 22 is coined to form a flat, squared-off support surface 32 of larger diameter than the pierced extension 22. The support surface 32 extends laterally about the circumference of the base of the pierced extension 22 and forms the lower wall of a groove. This support surface 32 replaces the second tapered portion 24. The first tapered portion 16 defined at the bottom of the stem end 14 is also coined to form a flat, squared-off surface 34. The flat surface 34 replaces the first tapered portion 16. The third tapered portion 26 between the upper body 28 and the lower body 30 is upset to form a shoulder 36 which extends outwardly about the periphery of the stem body 18 between the upper body 28 and the lower body 30.

In the fifth stage of the formation process, as shown in FIG. 6, a retention protuberance 38 is formed at the base of the stem 14 which is squared-off. A snap ring 40 is then placed over the top end 19 of the pierced extension 22 and is slid downwardly around the pierced extension 22 until the snap ring 40 rests upon the support surface 32. The snap ring 40 is best shown in FIGS. 12 and 13 and includes a circular body 42 which is also circular in cross section. The body 42 extends between a first end 44 and a second end 46. The ends 44 and 46 are spaced apart from one another forming a gap. The snap ring 40 has an inner diameter slightly larger than the diameter of the pierced extension 22 which allows the snap ring 40 to be slid over the top end 19 of the pierced extension 22 without expanding the diameter of the snap ring 40, or otherwise deforming the snap ring 40, and which allows the snap ring 40 to be compressed. The snap ring 40 also includes an outer diameter, which in an uncompressed condition, is slightly larger than the diameter of the upper body 28. When the snap ring 40 is expanded, the diameter of the snap ring 40 and the size of the gap between the ends 44 and 46 will be increased, and when the snap ring 40 is compressed the diameter of the snap ring 40 and the size of the gap between the ends 44 and 46 will be decreased.

As best shown in FIG. 8, a retention groove 48 is then formed by inserting a pointed orbitally rotating punch 50 into the recess 20 in the pierced extension 22 and applying a downward force. The orbital rotation of the punch 50 is schematically shown in FIG. 9. The punch 50 extends between a first end 52 having a tip 54 and base 56 at the second and opposite end of the punch 50. The punch 50 includes a longitudinal axis 58 which extends through the tip 54 and the punch base 56. The punch base 56 is located in a rotating head (not shown) which rotates in a circular orbit 60, either clockwise or counterclockwise, about a rotational axis 62 which may be oriented in any direction. The rotational axis 62 extends through the center 64 of the circular orbit 60 and is perpendicular to the plane of the orbit 60. The punch 50 is set in the head such that the longitudinal axis 58 of the punch 50 is at an angle between 3°-6° to the rotational axis 62. The tip 54 of the punch 50 is located on the rotational axis 62 such that the tip 54 remains on the rotational axis 62 as the head and the punch 50 orbitally rotate about the rotational axis 62. The punch 50 is also rotatable about the longitudinal axis 58.

The end 52 of the punch 50 includes a curvilinear surface 66 which is uniformly formed around the longitudinal axis 58 between the tip 54 and a circular edge 68. The curvilinear surface 66 includes a rounded or spherical surface 70 located at the tip 54 and a generally conical surface portion 72 which extends outwardly and away from the spherical surface 70 and the tip 54. The curvilinear surface 66 also includes an annular curved surface portion 74 which extends between the conical surface 72 and the circular edge 68. Although the preferred form of the method contemplates maintaining the stem stationary and rotating the punch 50, it is within the scope of the invention to rotate the stem and not the punch. The configuration of the punch surface 66 may be varied from the described configuration.

As shown in FIG. 7, the stem 10 is located such that the longitudinal axis 76 of the stem 10 is coaxial with the rotational axis 62 and extends through the tip 54 of the punch 50. As shown in FIG. 8, the punch 50 is moved downward to engage the top edge 21 of the pierced extension 22 while the punch 50 continues to orbitally rotate. The tip 54 of the punch 50 is inserted into the recess 20. As the curvilinear surface 66 comes into contact with the edge 21 of the extension 22, the surface 66 creates a moving radial line of pressure which is exerted against the wall of the cylindrical recess 20 in the extension 22. The surface 66 of the punch 50 will roll along the wall of the recess 20 as the punch 50 orbitally rotates about the axis 62, and as the punch 50 rotates about its own axis 58, such that there is essentially no sliding friction between the surface 66 and the extension 22. As the punch 50 rolls within the recess 20, the surface 66 displaces a small amount of stem material with each rotation of the punch 50. Continued rotation and insertion of the punch 50 deforms and expands the pierced extension 22 to form a collar 78 having continuous, tear and crack free inner and outer surfaces. The extension 22 and the collar 78 are preferably formed in a cold heading process. The collar 78 becomes the upper wall of the retention groove 48 and the support surface 32 becomes the lower wall.

When the pierced extension 22 is deformed to form the collar 78, an upwardly and outwardly inclined surface 80 is formed on the undersurface of the collar 78 as shown in FIGS. 8 and 11. The surface 80 is preferably formed at an approximate angle of 7° to the longitudinal axis 76 of the stem 10. When a force is exerted on the stem tending to remove the stem and caster from the article of furniture the stem supports, the inclined surface 80 produces a wedging effect which causes the snap ring 40 to move up the inclined surface 80. This causes the snap ring 40 to expand thereby increasing the force required to remove the stem 10 from a furniture base. This feature prevents any unintentional dislodgement of the stem 10.

As shown in FIGS. 15 and 16, the step of piercing the extension 22 to form a recess 20 may be eliminated to thereby form a stem 10A having a solid extension 90. The collar 78A and outwardly inclined surface 80A of the groove 48A are formed from the solid extension 90 in the same manner as described above by moving a generally flat faced orbitally rotating punch 92 downward to engage the top end of the solid extension 90. Continued rotation and insertion of the punch 92 into the solid extension 90 deforms and expands the extension 90 to form the collar 78A, having continous, tear and crack free inner and outer surfaces, and the upwardly and outwardly inclined surface 80A. A recess 94 is also formed in the extension 90. The punch 92, which is used to form the groove 48A in the solid extension 90, includes a generally flat planar circular surface portion 98 which is centered on and perpendicular to the axis 96. The punch 92 also includes a circular groove 100 which extends from and around the planar circular surface 98, and a conical surface portion 102 extending outwardly from and around the circular groove 100 to a circular edge 104. The configuration of the tip of the punch 92 may be varied from the described configuration.

As shown in FIG. 14, the planar support surface 32 may be replaced with a downwardly and inwardly sloped lower surface 82. The sloped surface 82 facilitates insertion of a stem 10 into a furniture base by easing the compression of the snap ring 40. The constricting ring 40 moves down the sloped surface 82, which action assists in achieving the desired result.

This method of forming a stem 10 and of assembling a snap ring 40 in a groove 48 in the stem 10 without expansion of the snap ring 40 is less expensive, quicker and easier than previous methods wherein the groove was formed by milling a slot into the stem and then inserting the snap ring into the slot by expanding the ends to accommodate the inner diameter of the stem located within the groove and then contracting the ends of the snap ring. With the ends of the snap ring expanded, the snap ring fits loosely around the groove and tends to extend over the edge of the support surface defined by the upper body of the stem. This makes it difficult to thread the stem into the hole in a furniture base. With the method of the present invention, the snap ring 40 is more closely centered about the pierced extension 22 since the ends 44 and 46 of the snap ring 40 do not need to be expanded to fit around the diameter of the pierced extension 22. This method is also advantageous over previous methods as the orbitally rotating punch 50 forms a continuous collar 78 which is free of the tears or cracks which were caused by previous methods. This provides a more durable and long lasting collar 78 and groove 48, a more pleasing aesthetic appearance, and also facilitates the insertion and removal of the stem 10 within a furniture base.

The wedging effect provided by the inclined surface 80 is beneficial, because as the upper body 28 of the stem 10 is inserted into a furniture base, the snap ring 40 locates against the support surface 32. When force is exerted to remove the stem 10 from the furniture base, the snap ring 40 moves upwardly along the inclined surface 80 and becomes expanded, thereby resisting the pull-out force to a greater extent than with the straight-sided cylindrical undercut of other stens. This expansion effect also offsets any tendency of the stem 10 to fall out of the furniture base.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A method of forming a stem and assembling a snap ring in a groove in said stem without expansion of said snap ring, the steps of the method comprising:
   cutting a length of wire, thereby providing a stem body with a top end and a bottom end;
   reducing the diameter of said top end, thereby forming said top end into a solid extension;
   forming a support surface about said stem body at a base of said solid extension, said support surface having a diameter greater than the diameter of said solid extension;
   providing a snap ring; sliding said snap ring over said solid extension without expansion of said snap ring and positioning said snap ring on said support surface;
   positioning a punch at an angle to a longitudinal axis of said stem, said punch including a tip having a generally planar circular surface portion including a generally circular edge, a circular grooved surface portion extending around said circular surface portion, and a conical surface portion extending around said circular grooved surface portion, said planar circular surface portion being at an angle other than perpendicular to said longitudinal axis of said stem;
   orbitally rotating said punch about said longitudinal axis of said stem, thereby causing relative rotation between said punch and said stem, and inserting said circular edge of said rotating punch into said top end of said solid extension thereby causing the material of said extension to flow into said grooved surface portion of said punch, and expand over said snap ring; thus forming a continuous collar having smooth continuous inner and outer surfaces free of tear or breaks, and also forming an upwardly and outwardly sloped undersurface extending from said support surface to said collar, such that a groove is defined by said collar and said support surface, said snap ring lying within said groove and being free to move from said support surface toward said collar.

2. The method of claim 1 including creating a moving line of pressure by said punch against said extension as said collar is formed.

3. The method of claim 1 wherein said flowing and expanding of said extension material comprises cold heading.

4. The method of claim 1 including forming said support surface such that said support surface is inwardly and downwardly sloped.

* * * * *